(12) United States Patent
Tehrani et al.

(10) Patent No.: US 8,964,272 B2
(45) Date of Patent: Feb. 24, 2015

(54) TRANSPARENCY TEMPLATE

(75) Inventors: Justin A. Tehrani, Loveland, CO (US); Virgil K. Russon, Greeley, CO (US); Steven J. Simske, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2616 days.

(21) Appl. No.: 11/553,942

(22) Filed: Oct. 27, 2006

(65) Prior Publication Data
US 2008/0144138 A1    Jun. 19, 2008

(51) Int. Cl.
*H04N 1/40* (2006.01)
*H04N 1/04* (2006.01)
*H04N 1/46* (2006.01)
*H04N 1/00* (2006.01)

(52) U.S. Cl.
CPC ....... *H04N 1/00681* (2013.01); *H04N 1/00702* (2013.01); *H04N 1/00737* (2013.01); *H04N 1/00755* (2013.01); *H04N 1/00761* (2013.01); *H04N 1/00774* (2013.01); *H04N 2201/0406* (2013.01); *H04N 2201/0408* (2013.01); *H04N 2201/0422* (2013.01)
USPC ........... 358/506; 358/447; 358/474; 358/486; 358/505

(58) Field of Classification Search
USPC ......... 358/506, 486, 447, 474, 475, 473, 472, 358/497, 494, 509, 505, 501; 382/294, 313, 382/312, 318, 319, 276, 255; 250/234, 235, 250/236, 239, 216, 227.26, 227.14, 227.11, 250/227.2, 578.1, 474.1
See application file for complete search history.

(56) References Cited

U.S. PATENT DOCUMENTS

| | | |
|---|---|---|
| 3,964,829 A | 6/1976 | Munis |
| 4,405,228 A | 9/1983 | Muscoplat |
| 4,601,573 A | 7/1986 | Utsugi |
| 5,144,455 A | 9/1992 | Stein et al. |
| 5,266,805 A | 11/1993 | Edgar |
| 5,606,379 A | 2/1997 | Williams |
| 5,633,719 A | 5/1997 | Oehlbeck et al. |
| 6,215,563 B1 | 4/2001 | Onishi et al. |
| 6,295,143 B1 | 9/2001 | Lee et al. |
| 6,380,539 B1 | 4/2002 | Edgar |
| 6,470,099 B1 | 10/2002 | Dowdy et al. |
| 6,771,396 B1 | 8/2004 | Cheatle et al. |
| 6,850,344 B2 * | 2/2005 | Chang .......................... 358/487 |
| 6,924,911 B1 * | 8/2005 | Ford et al. ..................... 358/506 |
| 7,359,093 B2 | 4/2008 | Schweid et al. |
| 2001/0033702 A1 * | 10/2001 | Kawabata ..................... 382/294 |
| 2002/0039205 A1 | 4/2002 | Chang |
| 2002/0051248 A1 * | 5/2002 | Cook et al. .................... 358/488 |

(Continued)

FOREIGN PATENT DOCUMENTS

| | | |
|---|---|---|
| EP | 0786688 A2 | 7/1997 |
| GB | 129444 A | 7/1919 |
| GB | 741439 A | 12/1955 |

OTHER PUBLICATIONS

New Service and Mask Making 101, Li/Bachman Foundry Team; UC Irvine; Aug. 2005.*

(Continued)

*Primary Examiner* — Ngon Nguyen
(74) *Attorney, Agent, or Firm* — Rathe Lindenbaum LLP; Todd A. Rathe

(57) ABSTRACT

Various method and apparatus are disclosed for scanning a transparency with a template

20 Claims, 5 Drawing Sheets

(56) References Cited

U.S. PATENT DOCUMENTS

| | | |
|---|---|---|
| 2002/0159165 A1 | 10/2002 | Ford |
| 2003/0016404 A1* | 1/2003 | Tecu et al. ............... 358/506 |
| 2003/0020970 A1* | 1/2003 | Haas et al. ............... 358/506 |
| 2004/0233483 A1 | 11/2004 | Harada et al. |
| 2005/0146757 A1* | 7/2005 | Haas et al. ............... 358/486 |
| 2006/0061837 A1 | 3/2006 | Huang et al. |

OTHER PUBLICATIONS international Search Report, Apr. 10, 2008, 7 pgs.

\* cited by examiner

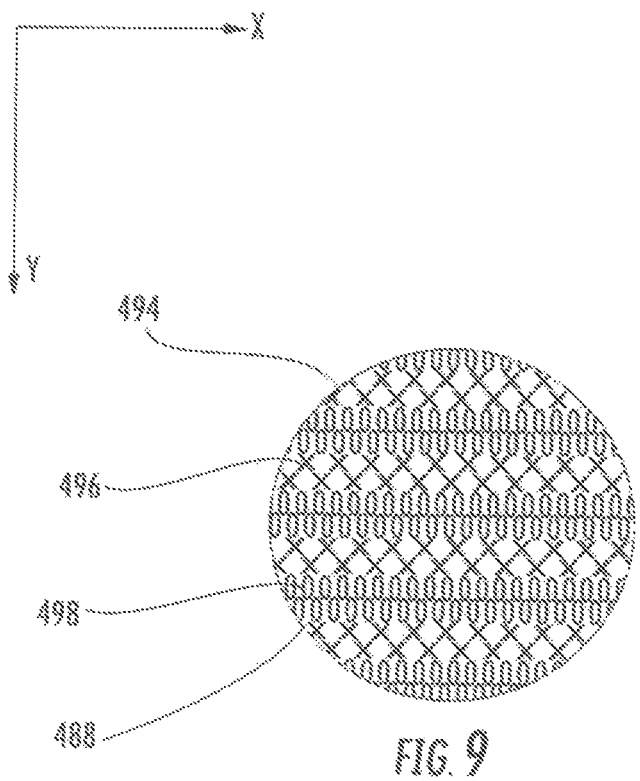

TRANSPARENCY TEMPLATE

BACKGROUND

Transmissive images or transparencies, including slides and negative, are sometimes scanned multiple times. Aligning multiple scans of a transparency may be difficult from a software processing standpoint.

BRIEF DESCRIPTION OF THE DRAWINGS

FIG. 9 is an enlarged fragmentary view of the template of FIG. 8 taken along line 9-9 according to an example embodiment.

DETAILED DESCRIPTION OF THE EXAMPLE EMBODIMENTS

Figure 1:
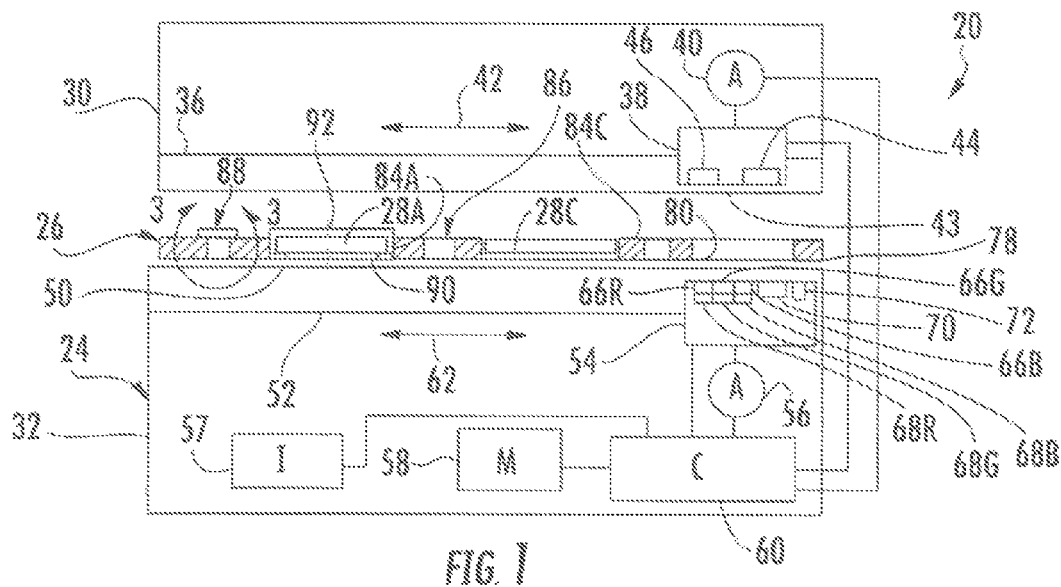
FIG. 1 is a schematic illustration of a scanning system including a template shown in section according to an example embodiment.

FIG. 1 is a schematic illustration of scanning system 20 according to an example embodiment. Scanning system 20 is configured to scan one or more transparencies multiple times. For purposes of this disclosure, the term "transparency" shall mean any media which is at least partially transmissive to visible light. Examples of transparencies include, but are not limited to, slides, negatives and medium or large format film. As will be described in more detail, scanning system 20 facilitates enhanced alignment of multiple scans of the transparencies for enhanced scanned image quality.

Scanning system 20 includes scanner 24 and template 26. Scanner 24 senses light that has passed through transparencies, such as transparencies 28, to form a digital or electronic image of transparencies 28. Scanner 24 includes cover 30 and scan bed 32. Cover 30 comprises a structure configured to overlie at least one transparency 28 positioned by template 26 upon bed 32. Cover 30 transmits electromagnetic radiation, such as visible light and infrared light, through transparencies 28 towards bed 32. In the example illustrated, cover 30 includes guide 36, emitter 38 and actuator 40. Guide 36 comprises one or more structures configured to guide movement of emitter 38 in the directions indicated by arrows 42 across scan bed 32. In one embodiment, guide 36 may comprise a shaft or a rod along which emitter 38 slides. In other embodiments, guide 36 may have other configurations for guiding movement of emitter 38.

Emitter 38 comprises one or more sources of electromagnetic radiation which are supported and configured to emit such electromagnetic radiation towards scan bed 32. In one embodiment, emitter 38 comprises a single elongate bar extending across scan bed 32 and movably supported along guide 36. In the particular example illustrated, emitter 34 is located behind a pane 43 of one or more transparent materials, such as glass or transparent polymers. In other embodiments, such a pane may be omitted.

In the example illustrated, emitter 38 is configured to selectively emit electromagnetic radiation having different wavelengths. In other words, emitter 38 is configured to emit electromagnetic radiation within a first range or spectrum having a first wavelength peak at a first time and to emit electromagnetic radiation within a second range or spectrum having a second distinct wavelength peak at a second distinct time. According to one embodiment, emitter 38 is configured to selectively emit infrared light, and visible light. In another embodiment, emitter 38 is configured to selectively emit visible light having different wavelength peaks or different "mixtures" of red, green and blue light. Because emitter 38 is configured to emit different wavelengths of light, system 20 may generate different scan images providing different information which facilitates enhanced digital or electronic image reproduction of such transparencies. In other embodiments, emitter 38 may be configured to just emit visible light having selectively controllable wavelength peaks or may be configured to just emit visible light having a single wavelength peak.

In particular example illustrated, emitter 38 includes visible light sources 44 and infrared light source 46 (schematically illustrated). Visible light source 44 comprises an elongate lamp having one ore more visible light emitting elements. According to one embodiment, visible light source 44 is configured to selectively emit visible light having different wavelength peaks or different "mixtures" of red, green and blue light. According to one embodiment, source 44 comprises a Cold Cathode Flourescent lamp commercially available from Shanghai Shine Photoelectonic Co. Ltd of Shanghai, China. In other embodiments, source 44 may comprise other lamps or other visible light emitting devices.

Infrared light source 46 comprises an elongate bar having one or more infrared light emitting elements. According to one embodiment, source 46 comprises a bar having one or more rows of infrared emitting diodes. According to one embodiment, source 46 comprises a Infrared LED commercially available from Ligitek Electronics Co. Ltd. of Taiwan. In other embodiments, other infrared emitting sources may be utilized.

Actuator 40 comprises an arrangement of components configured to move emitter 38 along guide 36 across transparencies 38 located above scan bed 32. In one embodiment, actuator 40 may include a pulley and belt arrangement coupled to emitter 38 and driven by one or more motors (not shown). In other embodiments, other mechanisms my be employed for moving emitter 38 along guide 36. In still other embodiments, guide 36 and actuator 40 my be omitted where emitter 38 is alternatively configured to emit electromagnetic radiation across a desired area without being mechanically moved. For example, in one embodiment, cover 30 may be configured to be manually moved and placed opposite to bed 32 such that emitter 38 emits light across one or more selected transparencies 28. In such an embodiment, cover 30 may be smaller than scan bed 32 so as to only cover a portion of scan bed 32. In yet another embodiment, emitter 38, with appropriate optics, may be configured to emit light across a substantial area of bed 32 without being mechanically or manually moved.

Scan bed 32 comprises a structure upon which template 26 and positioned transparencies 28 may be supported while scan bed 32 senses electromagnetic radiation that has passed through such transparencies 28. In the example illustrated, scan bed 32 includes pane 50, guide 52, sensor 54, actuator 56, user interface 57, memory 58 and controller 60. Pane 50 comprises a plate or platform of one or more transparent materials, such as glass or a transparent polymer, upon which transparency 28 may be positioned during scanning. Pane 50 permits electromagnetic radiation that is passed through transparencies 28 and further through template 26 to be received and sensed by sensor 54. In the particular embodiment illustrated, pane 50 is transparent substantially across its entire surface area. In other embodiments, pane 50 may include a greater percentage of opaque supporting portions.

Guide 52 comprises one or more structures configured to movable support sensor 54 for movement in the directions indicated by arrows 62 across pane 50. In one embodiment, guide 52 may comprise a shaft or rod along which sensor 54 slides. In yet another embodiment, guide 52 may comprise an elongate rack gear along which sensor 54 is guided and driven. In still other embodiments, guide 52 may comprise other structures are mechanisms for guiding movement of sensor 54.

Sensor 54 comprises a device configured to sense electromagnetic radiation that has passed through transparencies 28 and template 26. In the particular example illustrated, sensor 54 includes filter elements 66R, 66G, 66B (collectively referred to as filter elements 66), sensor elements 68R, 68G and 68B (collectively referred to as sensor elements 68). Filter elements 66 filter different wavelengths of light prior to such wavelengths of light being sensed by sensor elements 68. In the example illustrated, filter element 66R filters red wavelength of light, filter element 66G filters green wavelengths of light and filter element 66B filters blue wavelengths of light. As a result, their corresponding sensor elements 68R, 68G and 68B, respectively, sense selected wavelengths or components of white visible light. In the particular embodiment illustrated, sensor elements 68 are further configured to sense some level of infrared wavelengths. For example, sensor elements 68R (the red channel) is most sensitive to infrared light. According to one embodiment, sensor elements 68 comprise Charged Couple Device (CCD) sensors commercially available from Toshiba Inc. USA of Irvine, California. In other embodiments, other sensors may be employed. For example, a separate infrared sensor may alternatively be provided.

As further shown by FIG. 1, the movable structure supporting components of sensor 54 may additionally include emitter 72 (schematically illustrated). Emitter 72 comprises one or more sources configured to emit visible light towards cover 30. Because scan bed 32 includes emitter 72, scanner 24 may be further utilized for scanning images from opaque materials. In particular, emitter 72 emits light which is reflected off the opaque materials and sensed by sensor elements 68 to form an electronic or digital image corresponding to the image upon the opaque material. In other embodiments, emitter 72 may be omitted.

Actuator 56 comprises an arrangement of components configured to move sensor 54 along guide 52 across transparencies 28 located above pane 50. In one embodiment, actuator 56 may include a pulley and belt arrangement coupled to sensor 54 and driven by one or more motors. In other embodiments, other mechanisms may be employed for moving sensor 54 along guide 52.

User Interface 57 comprises one or more devices configured to permit a user or person to provide controller 60 with commands such as for initiating scanning of a transparency, such as requesting selected image enhancements or corrections to be performed or for entering color or tine preference. User interface 57 may comprise one of a variety of different input mechanisms including, but not limited to, a keyboard, a pushbutton or toggle switch, a microphone and associated speech recognition software, a touchpad, a touch screen and the like. In particular embodiments, interface 57 may be omitted from scanner 24 and may alternatively be provided as part of an associated electronic device such as an associated computing device such as a laptop or desktop computer.

Memory 58 comprises one or more persistent storage devices configured to store operating instructions for controller 60. In one embodiment, memory 58 may further be configured to store a digital or electronic image files generated by controller 60 from scans of transparencies 28. Although memory 58 is illustrated as being incorporated into scanner 24, to other embodiments, memory 58 may be located externally to scanner 24, such as in an associated computing device. Memory 58 may have a variety of forms.

Controller 60 comprises one or more processing units configured to generate control signals directing movement of emitter 38 and sensor 54 by actuators 40 and 56, respectively. Controller 60 is further configured to generate control signals directing operation of emitter 38 and sensor 54. In addition, controller 60s configured to receive signals from sensor 54 and to from digital or electronic images from such signals. As will be described in more detail hereafter, controller 60 aligns multiple images of the same transparency 28 using such signals to apply digital enhancements ore corrections and original digital image or to provide the generated digital or electronic image of the transparency with enhanced color accuracy.

For purpose of this application, the term "processing unit" shall mean a processing unit that executes sequences of instructions contained in a memory. Execution of the sequences of instructions causes the processing unit to perform steps such as generating control signals. The instructions may be loaded in a random access memory (RAM) for execution by the processing unit form a read only memory (ROM), a mass storage device, or some other persistent storage. In other embodiments, hard wired circuitry may be used in place of or in combination with software instructions to implement the functions described. For example, controller 60 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 2:
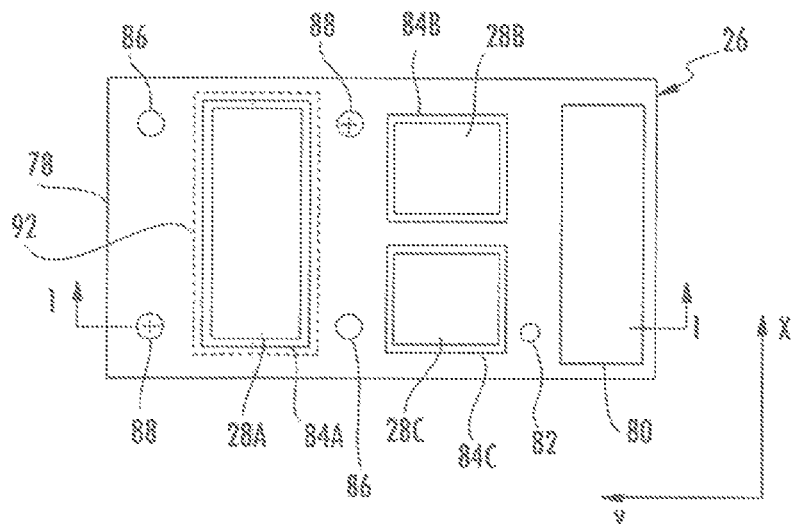
FIG. 2 is a top plan view of a template of the system of FIG. 1 according to an example embodiment.

Template 26 comprises a structure configured to retain and position one or more transparencies 28 upon pane 50 of scan bed 32. FIG. 2 illustrates a top plan view of temple 26 while FIG. 1 illustrates a sectional view of template 26 take along line 1-1 of FIG. 2. As shown by FIG. 2, template 26 includes body 78, calibration opening 80, template identification opening 82, transparency receiving windows 85A, 84B and 84C (collectively referred to as window 84), scan aligners 86 and scan aligners 88. Body 78 comprises a sheet or panel on one or more layers of one or more materials configured to rest upon pane 50 and form openings 80, 82, windows 84 and scan aligners 86, 88. In one embodiment body 78 may be formed for one or more layers of polymeric materials. In one embodiment, body 78 may be formed from cellulose materials, metal materials or combinations thereof. In the embodiment illustrated, body 78 is integrally formed as a single unitary body, reducing fabrication cost and complexity. In other embodiments, body 78 may be formed from multiple parts joined to one another.

Calibration opening 80 comprises an opening extending through body 78 configured to permit substantially all electromagnetic radiation being transmitted by emitter 38 (visible light or infrared light) to pass through template 26 to sensor 54 without being blocked. In those embodiments in which emitter 38 comprises an elongate bar of emitting elements, opening 80 comprises an elongate correspondingly sized opening. Opening 80 facilitates calibration of emitter 38 and sensor 54 which is positioned blow opening 80 during such calibration as shown in FIG. 1. In the particular embodiment illustrated, calibration opening 80 is located at one far end of template 26 so as to not obstruct the formation or positioning of windows 84. In other embodiments, calibration opening 80 may be provided at other locations or may be omitted.

Template identification opening 82 comprises an opening extending through body 78 configured to permit electromagnetic radiation, such as visible light, being transmitted by emitter 38 to pass through opening 82 and to be sensed by sensor 54. Opening 82 is formed at a predetermined location in body 78 based upon a particular type, configuration or characteristic of template 26. For example, although template 26 includes opening 82 in the location shown, another embodiment of template 26 may have other distinct characteristics, such as other alternatively configured windows 84. This other distinct template would include identification opening 82 at another distinct location of have a differently shaped or configured identification opening 82. As a result, by sensing a location where light is transmitted through opening 82 or the characteristics of light passed through opening 82, scanner 24 may identify the type of template being used. Although template 26 is illustrated as including a single identification opening 82, in other embodiments, template 26 may include more than one identification opeing 82 and may have identification openings 82 having other shapes and sizes. In other embodiments, opening 82 may be omitted.

Transparency receiving windows 84 comprise openings or depressions provided in body 78 that are configured to receive transparencies 28. Such windows 84 completely or substantially surround their received templates 28 and are spaced from one another across a surface area of template 26. In the particular example illustrated, template 26 is configured to retain multiple distinct types of transparencies. For example, window 84A is configured to retain a strip of negatives (transparency 28A), window 84B is configured to retain a medium or large format film (transparency 28B) and window 84C is configured to retain a slide (transparency 28C). In the example illustrated, window 84A has an opening width transverse to the elongate axis of the strip of negatives of between about 9 inches and about 1 inch. Window 84B has opening dimensions of about 7.25 inches by about 2.25 inches. Window 84C has opening dimensions of between about 2 inches by about 2 inches. In other embodiments, template 26 may include a greater or fewer number of such windows 84 and windows 84 may have other dimensions and relative locations. In lieu of including multiple distinct windows 84, template 26 may include a single type of window 84 for retaining a single type of transparency.

As shown by FIG. 2, window 84A additionally includes a shoulder or lip 90 and lid 92. Lip 90 extends along a perimeter of the opening of window 84A. Lip 90 protrudes along substantially an entire outer edge of window 84A and provides a surface upon which an outer edge of transparency 28A may rest above pane 50. Although not illustrated, in other embodiments, other windows 84 of template 26 may also be provided with lip 90 with or without 92.

Lid 92 comprises one or more structures configured to be secured to body 78 so as to retain transparency 28A in a more flat state for enhanced scanning. In one embodiment, lid 92 is hinged to body 78 so as to pivot between an open position permitting insertion of transparency 28A or removal of transparency 28A. In other embodiments, lid 92 may be snapped or otherwise releasable but securely retained to body 78 opposite to lip 90. In still other embodiments, lid 92 may be integrally formed or fastened to body 78 opposite to lip 90, wherein a slit or other opening is provided for sliding or inserting transparency 28A in between lip 90 and lid 92 such that the transparency 28A is sandwiched therebetween.

Scan aligners 86 comprise openings or apertures extending through body 78 configured to assist scanner 24 in identifying a relatively precise location in body 78 during a first scan of transparencies 28 retained by template 26 and during second and additional subsequent scans of the same transparency 28 retained in the same windows 84 of template 26. Because scanner 24 is better able to identify a consistent precise location in body 78 of template 26, scanner 24 is better able to align the multiple scanned images to map one scanned image to another scanned image.

In the particular example illustrated, scan aligners 86 comprise openings extending through body 78. In one embodiment, such openings are spaced at least about 3 mm from windows 84 to reduce the impact of such light passing through aligner 86 on the light passing through the transparency 28. The apertures of scan aligners 86 have a varying dimension such that an intensity of light passing through such aligners 86 and being sensed by sensor 54 will also vary depending upon a percentage of light passing through an aligner 86 and a percentage of light being blocked by portions of body 78 about aligner 86. As a result, as elements of emitter 38 and sensor 54 are passing across aligner 86 as controlled by as by a stepper motor, servomotor or other mechanism, sensor 54 will receive an increased intensity of electromagnetic radiation. The geometric center of aligner 86 in the Y-axis direction will correspond to the center of the summation of intensities received by sensor 54 in the Y-axis direction as it passes aligner 86 with or without respect to a threshold.

Likewise, those particular portions of sensors 68 in the X-axis direction will also receive an increased intensity of electromagnetic radiation (visible light or infrared light). The geometric center of aligner 86 in the Y-axis direction will correspond to the center of the summation of intensities received by sensor 54 in the Y-axis direction as it passes aligner 86 with or without respect to a threshold. This determined center of alignment aligner 86 (X and Y coordinates) provides or pinpoints a relatively precise location in the body 78 of template 26 that may be used for aligning multiple scanned images.

Although scan aligner 86 is illustrated as being circular, in other embodiments, the apertures of scan aligner 86 may have other shapes, wherein the size of the aperture continuously varies in bother the X and Y axis directions. Examples include, but are not limited to, diamonds, ovals and the like. Although scan aligners 86 are illustrated as having apertures with the same shape, in other embodiments, the apertures of different scan aligners 86 may have different shapes. Although the apertures of scan aligners 86 are illustrated in FIG. 1 as being empty or void (filled with air), in other embodiments, the apertures of aligners 86 may alternatively be at least partially filled or substantially filled with one or more transparent materials. In one embodiment, the apertures of aligners 86 may be formed concurrently with the forming of body 78, wherein body 78 is formed from substantially opaque material while those areas of aligners 86 are formed or molded from substantially transparent material.

Figure 3:
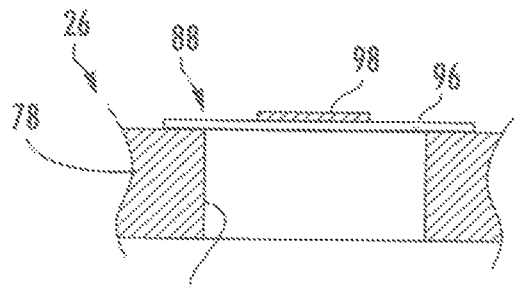
FIG. 3 is an enlarged view of the template of FIG. 1 taken a long line 3-3 according to an example embodiment.

Like scan aligners 86, scan aligners 88 are configured to facilitate a determination of the precise location in body 78 to assist in aligning multiple scans of images. As shown by FIG. 3, which is a sectional view of one of scan aligners 88, each scan aligner 88 includes aperture 94, support 96 and fiducial 98. Aperture 94 comprises an opening extending through body 78 configured to transmit electromagnetic radiation, such as visible light or infrared light through template 26. In one embodiment, aperture 94 is empty such that aperture 94 is filled with air. In another embodiment, aperture 94 may be at least partially filled with a transparent material, such as a transparent polymer or glass. Although aperture 94 is illustrated as being circular, aperture 94 may have a variety of sizes and shapes as will as a variety of locations with respect to a remainder of body 78.

Support 96 comprises one or more layers of one or more transparent materials extending across or spanning 94. Supports 96 supports fiducial 98. In one embodiment, support 96 may comprise a layer or patch of a transparent polymeric material such as transparency paper having a thickness of about 0.1 mm. In other embodiments, support 96 my be formed from other materials and may have other thicknesses.

Fiducial 98 comprises one or more relatively precise markings opposite aperture 94. Fiducial 98 precisely block portions of electromagnetic radiation, such as visible light, that would otherwise pass through aperture 94 to be sensed by sensor 54. As a result, sensor 54 detects fiducial 98. By detecting fiducial 98 during each of multiple scans of a transparency 28, system 20 may align the scanned images using fiducial 98 as a point of reference. In one embodiment, fiducial 98 comprises one or more thin and relatively precise opaque or light blocking lines or markings. In another embodiment, fiducial 98 comprises a large opaque area having one or more thin and relatively precise openings within the opaque area. According to one embodiment, fiducial 98 is printed upon support 96 and support 96 is overlaid across aperture 94. In one embodiment, fiducial 98 is printed upon support 96 with an inkjet drop-on-demand printer. In other embodiments, fiducial 98 may be formed or provided on support 96 in other manners. For example, in other embodiments, fiducial 98 may be formed as part of support 96. In those embodiments in which aperture 94 is filled or is otherwise solid, fiducial 98 may be directly printed or otherwise formed upon the one or more materials filling aperture 94 or within aperture 94, allowing support 96 to be omitted.

For purposes of illustration, template 26 is illustrated as including both scan aligners 86 and 88. As a result, template 26 may be used with many different types scanning systems. For example, one scanning system 20 may alternatively be configured to align image scans based upon the detective location of fiducial 98 during multiple scans such as with scan aligners 88. Another scanning system 20 may alternatively be configured to align images during multiple scans using centers of apertures through template 26 that are determined by sensing intensities of light transmitted through template 26 such as with scan aligners 86. Although template 26 is illustrated as including two scan aligners 86 and two scan aligners 88, in other embodiments, template 26 may include greater or fewer is of such scan aligners 86 and 88. In other embodiments, template 26 may alternatively include one or the other of scan aligners 86 and 88.

Figure 4:
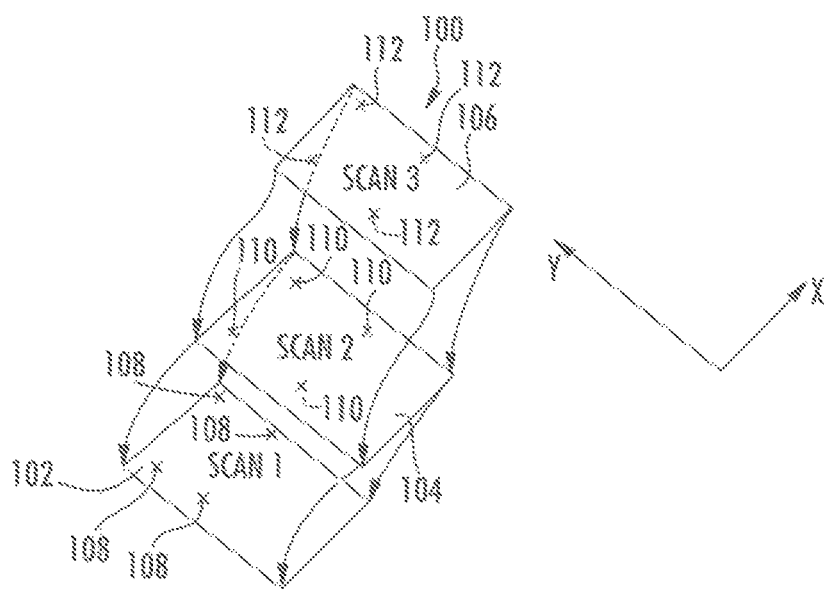
FIG. 4 is a schematic diagram illustrating alignment of image scans according to an example embodiment.

FIG. 4 schematically illustrates the generation of a single digital or electronic image 100 formed by combining or using information obtained from multiple distinct image scans 102, 104 and 106 of a single transparency 28 (shown in FIG. 2). Each image scan 102, 104 and 106 includes different information which enhances the image quality of the resulting electronic image 100. Although image 100 is illustrated as being formed form three distinct scan, in other embodiments, image 100 may be formed from a combination of information from any two of image scans 102, 104 and 106 or may be formed using information obtained from greater than three image scans.

To form image 100, a person places template 26 upon pane 50 of scan bed 32 and positions one or more of transparencies 28 within windows 84. A user may additionally close lid 92 over transparency 28A to retain transparency 28A in a more flat condition. Thereafter, a user may enter a command directing scanner 24 to generate a digital or electronic image of the one or more transparencies 28 using interface 57. The digital image 100 shown in FIG. 4 schematically represents an electronic image of one of transparencies 28.

In response to such user input commands, controller 60, following instructions contained in memory 58, generates control signals directing emitter 38 to emit light and sensor 54 to receive and sense such light. Based upon such signals received from sensor 54, controller 60 calibrates both emitter 38 and sensor 54. In particular circumstances where emitter 38 and sensor 54 have been previously calibrated, this step may be omitted.

Once emitter 38 and sensor 54 have been calibrated, controller 60 generates additional control signals actuating visible light source 44 and sensing elements 68 of sensor 54. Controller 60 also generates control signals directing actuators 40 and 56 to concurrently or near simultaneously move emitter 38 and sensor 54 across template 26 while emitter 38 and sensor 54 are substantially aligned opposite to one another, sandwiching transparency 28 there between. During this first pass across template 26, light source 44 is actuated in response to control signals from controller 60 to emit visible light having a first wavelength peak. As emitter 38 and sensor 54 are moved across template 26, the visible light emitted from emitter 38 passes through identification opening 82, through each of transparencies 28 contained within windows 84 and through the apertures of scan aligners 86 and 88. The light transmitted through templates 26 and through transparencies 28 is sensed by each of sensing elements 68 of sensor 54 which generate signals that are transmitted to controller 60. Controller 60 uses such signals to generate a first digital or electronic image 102 (shown in FIG. 4) of each of transparencies 28. Controller 60 further uses signals received from sensors 54 indicating the size and location of identification opening 82 to identify the type of template 26 being used and to identify relatively precise alignment locations 108 on template 26 relative to each of transparencies 28 using scan aligners 86 and 88. In one embodiment, such alignment locations have a minimum width of one pixel at the scan resolution. In other embodiments, this width or dimension may vary depending upon a point size of the scanner, a sensitivity of a thresholding algorithm that identifies the center of the aperture and the resolution at which the image is scanned. The information of image 102 is stored in memory 58.

Upon completion of the first pass of emitter 38 and sensor 54 across template 26, controller 60 generates additional control signals actuating light source 44 to a distinct state in which visible light having a distinct wavelength peak is emitted. Controller 60 also generates control signals causing actuators 40 and 56 to move emitter 38 and sensor 54 across template 26 a second time. During this second pass, sensing elements 68 of sensor 54 once again receive and sense the visible light that has passed through the various portions of template 26 including template identification opening 82, transparencies 28 and the apertures of scan aligners 86, 88. Based on corresponding signals received from sensor elements 68, controller 60 generates a second digital image 104. Based on corresponding signals received from sensor elements 68, controller 60 further identifies relatively precise alignment locations 110 on image 104.

After images 102 and 104 are stored in memory 58, or in other memory, controller 60 generates control signals turning off visible source 44 and actuating infrared source 46. Controller 60 further generates control signals actuating sensing elements 68 and further directing actuators 40 and 56 to once again moved emitter 38 and sensor 54 back across template 26 in a near concurrent or near simultaneous fashion. During this third pass, infrared wavelengths of electromagnetic radiation or light pass through the various portions of template 26 including template identification opening 82, transparencies 28 and the apertures of scan aligners 86, 88. Based on corresponding signals received from infrared sensor 70, controller 60 generates a third digital image 106. Based on corresponding signals received from sensor elements 68, controller 60 further identifies relatively precise alignment locations 112 on image 106. In contrast to images 102 and 104, image 106 identifies scratches or other imperfections using the infrared light. Image 106 provides a map identifying the location of such defects in the transparency 28, enabling controller 60 to apply digital corrections or enhancements to such imperfections.

In other embodiments, sources 44 and 46 may emit visible light and infrared light concurrently as emitter 38 and senor 54 are moved across template 26. In such an embodiment, sensing elements 68 and 70 concurrently sense visible light and infrared light, respectfully, that has passed through template 26. In such an embodiment, scanning time is reduced by reducing the number of passes across template 26.

As shown by FIG. 4, upon storage of the scanned images 102, 104 and 106 in memory 58, controller 60 used the information from images 102, 104 and 106 to form the final image 100. In particular, controller 60 utilizes images 100-104 to identify proper color and hue for each portion of digital image 100. Controller 60 further uses image 106 to correct imperfections in the digital image 100 resulting from imperfections in the scanned transparency 28. Controller 60 uses alignment location 108, 110, 112 to map the information obtained from each of the images to one another to reduce the likelihood of color adjustments or imperfection corrections being applied to incorrect locations.

Figure 5:
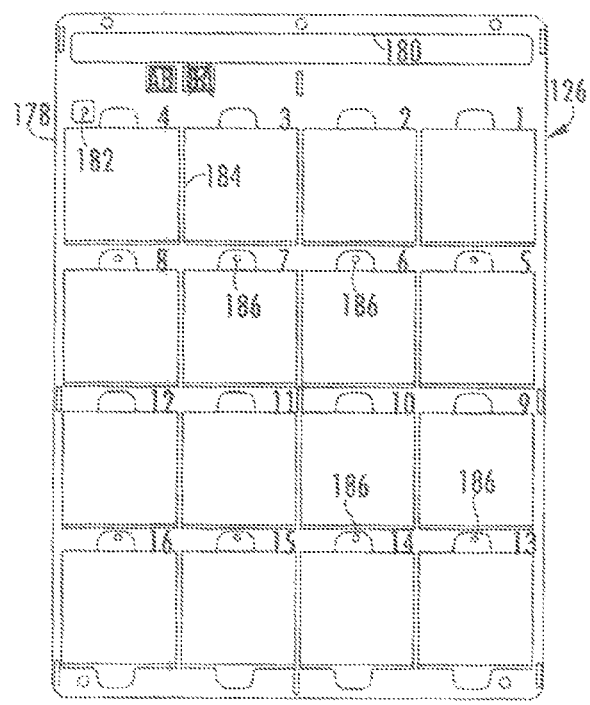
FIG. 5 is a top plan view of another embodiment of a template according to an example embodiment.

FIGS. 5-8 illustrate templates 126, 226, 326, and 426 respectively, various examples of template 26. As shown by FIG. 5, template 126 includes body 178, calibration opening 180, template identification opening 182, transparency windows 184 and scan aligners 186. Like opening 80 (shown in FIG. 1), opening 180 is elongate opening configured extends substantially across an entirely of emitter 38 and facilitates calibration of emitter 38 and sensor 54 (shown in FIG. 1). Like identification opening 82 of template 26 (shown in FIG. 1), identification opening 182 extends through body 178 and is used to identify the particular templates 126 to scanner 24.

Windows 184 are similar to window 84C (shown in FIG. 2). Windows 184 are configured to receive and completely surround individual slides. In the example illustrated, template 126 is configured to retain 16 individual slides. Each slide has dimensions of about 2 inches by about 2 inches. Scan aligners 186 are substantially similar to scan aligners 86 (shown in FIG. 2). Scan aligners 186 functions similarly to scan aligners 86 to assist scanner 24 in identifying precise common alignment or reference locations in multiple scans such that information from a first scan may be properly mapped to a second and additional scans.

Figure 6:
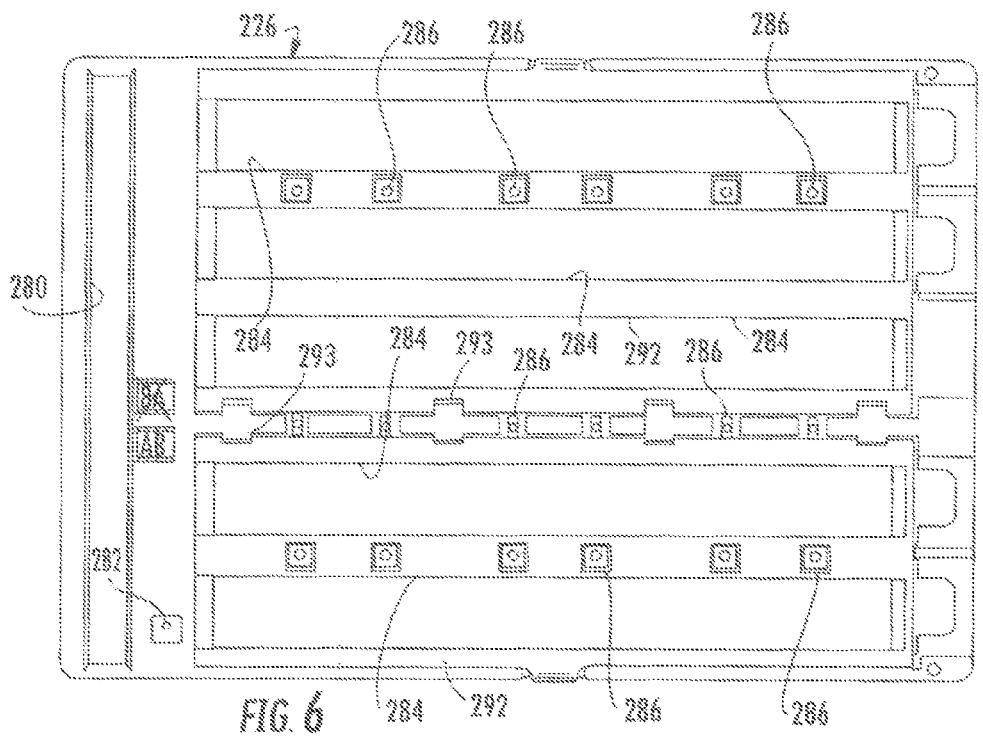
FIG. 6 is a top plan view of another embodiment of a template according to an example embodiment.

As shown by FIG. 6, template 226 includes body 278, calibration opening 280, template identification opening 282, transparency windows 284 and scan aligners 286. Like opening 80 (shown in FIG. 1), opening 280 is elongate opening configured to extend substantially across an entirety of emitter 38 facilitate calibration of emitter 38 and sensor 54 (shown in FIG. 1). Like identification opening 82 of template 26 (shown in FIG. 1), identification opening 282 extends through body 278 and is used to identify the particular template 226 to scanner 24 (shown in FIG. 1).

Windows 284 are similar to window 84A (shown in FIG. 2). Windows 284 are configured to receive and completely surround individual 35 mm negative strips. Like window 84A, each of windows 284 which are hinged to body 178 by hinges 293, permitting lids 292 to be opened and closed for reception or withdrawal of transparencies or blanks.

In the example illustrated, template 226 is configures to retain five negative strip transparencies. In the example illustrated in FIG. 6, four of windows 284 are filled with blanks (not shown) which are opaque structures configured to block light from being transmitted through unused windows 284. As such, temple 226 has a single window 284 ready to receive a negative strip transparency.

Scan aligners 286 are substantially similar to scan aligners 86 (shown in FIG. 2). Scan aligners 286 perform essentially identical to scan aligners 286 to assist scanner 24 in identifying precise common locations in multiple scans such that information from a first scan may be properly mapped to a second and additional scans. Although template 226 illustrates as having three rows of six scan aligners 286, in other embodiments, template 226 may have greater or fewer number of such rows and greater of fewer number of such scan aligners 286 in each row.

Figure 7:
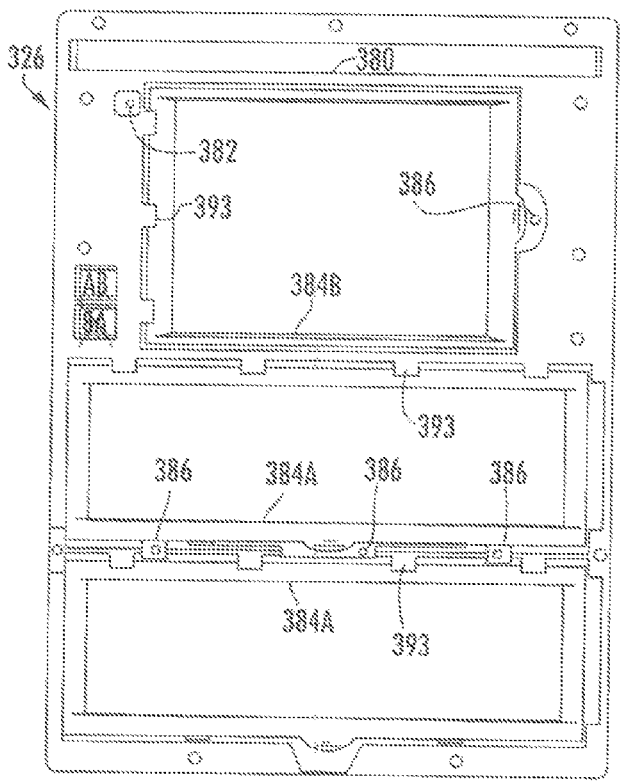
FIG. 7 is a top plan view of another embodiment of a template according to an example embodiment.

As shown by FIG. 7, template 326 includes body 378, calibration opening 380, template identification opening 382, transparency windows 384A, 384B (collectively referred to as windows 384) and scan aligners 386. Like opening 80 (shown in FIG. 1), opening 380 is elongate opening configured to extend substantially across an entirely of emitter 38 facilitate calibration of emitter 38 and sensor 54 (shown in FIG. 1). Like identification opening 82 of template 26 (shown in FIG. 1), identification opening 382 extends through body 378 and is used to identify the particular template 326 to scanner 24. Windows 384 are similar to window 84A (shown in FIG. 2) except that window 384A are configured to receive medium format film while window 384B is configured to receive large format film. Like window 84A, each of windows 384 include an underlying lip 90 (shown in FIG. 1). Template 326 further includes lids 392 which reception or withdrawal of transparencies of blanks. In particular embodiments, lip 90 may be omitted, where lids 392 press transparencies against pane 50 of scan bed 32 (shown FIG. 1).

Scan aligners 386 are substantially similar to scan aligners 86 (shown in FIG. 2). Scan aligners 386 perform essentially identical to scan aligners 386 to assist scanner 24 in identifying precise common locations in multiple scans such that information from a first scan may be properly mapped to a second and additional scans. Although template 326 is illustrated as having one row of three scan aligners 326 and a separate scan aligner 386 for window 384B, in other embodiments, template 326 may have greater or fewer number of such scan aligners 386 and the arrangement of scan aligners 386 maybe varied.

Figure 8:
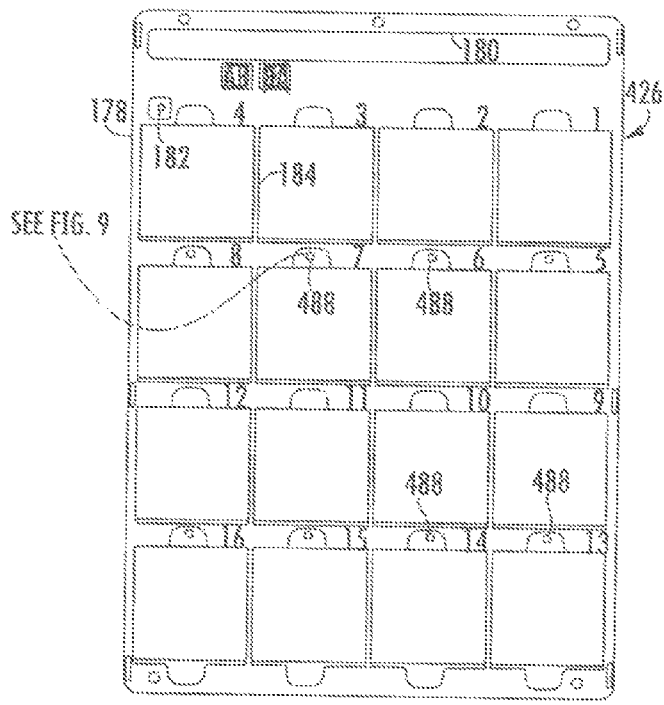
FIG. 8 is a top plan view of another embodiment of a template according to an example embodiment.

As shown by FIG. 8, template 426 is substantially similar to template 126 except that template 426 includes scan aligners 488 in lieu of scan aligners 186. Those remaining elements of template 426 which correspond to elements of the template 126 are numbered similarly. As shown by FIG. 8, scan aligners 488 are located between consecutive rows of windows 184. Because multiple aligners 488 80 used to map one scanned image to another, improve alignment may be achieved. In other embodiments, template 426 may have greater or fewer of such scan aligners 488 in such scan aligners 488 may be provided at other locations on template 426.

FIG. 9 is an enlarged view illustrating one of scan aligners 488 in more detail. As shown by FIG. 9, scan aligner 488 is similar to scan aligner 88 shown and described with respect to FIGS. 1-3. In the example illustrated in FIG. 9, scan aligner 488 comprises an aperture 494, an underlying support 496 upon which are in which is formed fiducials 498. Like aperture 94, aperture 494 comprises an opening extending through body 178 of template 426. Support 496 may comprise a thin sheet of one or more layers of transparent of clear polymeric material or glass spanning or extending across aperture 494. Fiducials 498 comprises markings having relatively thin or precise dimensions to facilitate identification of relatively precise alignment locations by a scanner. In the particular example illustrated, fiducials 498 comprise a multitude of crosses printed upon support 496. In other embodiments, fiducials 498 may have other configurations and may be formed in other manners.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   placing a template on a scan bed;
   locating a transparency in a window of the template;
   passing a first light through a first aperture in the template during a first scan of the transparency;
   passing a second light through the first aperture in the template during a second scan of the transparency; and
   aligning a first electronic image from the first scan and a second electronic image from the second scan based on sensed light through the aperture.

2. The method of claim 1, wherein the first light and the second light are passed through a first transparent layer across the aperture.

3. The method of claim 2, wherein the transparent layer includes a first fiducial marking on the layer.

4. The method of claim 3, wherein the fiducial marking is printed upon the transparent layer.

5. The method of claim 1 further comprising:
   sensing light that has passed through an opening to identify the template.

6. The method of claim 1, wherein the transparency is selected from a group of transparencies consisting of a film negative strip, medium format film, large format film, a slide or combinations thereof.

7. The method of claim 1 further comprising:
   sensing an intensity of the first light that has passed through the first aperture; and
   determining a location of the first aperture based on the sensed intensity of the first light.

8. The method of claim 1, wherein the first light and the second light are from one or more same sources.

9. The method of claim 1, wherein the first light and the second light are from one or more different sources.

10. The method of claim 9, wherein the first light is visible light and wherein the second light is infrared light.

11. The method of claim 1, wherein the first light is a first visible light having a first wavelength peak and wherein the second light is a visible light having a second wavelength peak.

12. The method of claim 1 further comprising:
    passing the first light through a second aperture through the template during the first scan of the transparency;
    passing the second light through the second aperture through the template during the second scan of the transparency; and
    aligning the first electronic image from the first scan and the second electronic image from the second scan based on sensed light through the second aperture.

13. The method of claim 1, wherein the first light is a first visible light, wherein the second light is a second visible light distinct from the first light and wherein the method further comprises:
    passing a third infrared light through the first aperture in the template during a third scan of the transparency; and
    aligning a third electronic image from the third scan with the first electronic image and the second electronic image based on sensed light through the aperture.

14. A system comprising:
    a scanner comprising:
    a scan bed; and
    a controller; and
    a template comprising:
    a body having a window configured to receive a transparency; and
    an aperture through the body configured to transmit light when the template is placed on the scan bed, wherein the controller is configured to align multiple scanned images using sensed light through the aperture.

15. The system of claim 14, wherein the template further includes a transparent layer across the aperture and a fiducial marking affixed on the transparent layer.

16. The system of claim 14, wherein the controller is configured to align the scanned images by determining a location of the aperture using a sensed intensity of light that has passed through the aperture.

17. The system of claim 14, wherein the scanner further comprises a first light source configured to emit visible light towards the transparency and a second light source configured to emit infrared light towards the transparency.

18. The system of claim 14, wherein the scanner further comprises one or more light sources configured to selectively emit distinct colors of visible light.

19. A transparency template comprising:
    a body having a window configured to receive a transparency;
    an aperture through the body configured to transmit light when the template is placed on a scan bed; and
    a transparent layer across the aperture.

20. The transparency template of claim 19 further comprising a fiducial marking affixed on the layer.

* * * * *